United States Patent

[11] 3,578,810

[72] Inventor Gordon Newstead
Moorside, Durham, England
[21] Appl. No. 844,279
[22] Filed July 24, 1969
[45] Patented May 18, 1971
[73] Assignee R. B. Bolton (Mining Engineers) Limited
Durham, England
[32] Priority July 30, 1968
[33] Great Britain
[31] 36316/68

[54] CABLE HANDLER TROUGHS
4 Claims, 2 Drawing Figs.
[52] U.S. Cl.............................................. 299/43,
198/204
[51] Int. Cl........................................... E21c 35/20
[50] Field of Search......................................... 299/43, 34;
198/1, 204

[56] References Cited
UNITED STATES PATENTS
3,367,718 2/1968 Hauschopp..................... 299/43

FOREIGN PATENTS
1,231,195 12/1966 Germany..................... 299/34
729,085 5/1955 Great Britain................. 198/204
922,346 3/1963 Great Britain................. 198/1

Primary Examiner—Evon C. Blunk
Assistant Examiner—Douglas D. Watts
Attorney—Jacobs & Jacobs ABSTRACT: The present invention relates to chain conveyors for conveying bulk material, wherein the conveyor has mounted to it and extending along its length a trough for cables used in the operation of the conveyor. A tongue and an upstanding pin are provided on a fixed portion of the conveyor, and a slot to receive the tongue is provided on the trough. A locking plate extends through an aperture in an upright portion of the trough and over the pin. Shoulders on the plate engage the sides of the portion adjacent the aperture. A split dowel passes through the pin to retain the plate on the pin. The plate holds the trough in position on the tongue, but can be easily removed without disturbing the trough. The invention is particularly applicable to a conveyor used at a mining face, wherein the open-top trough contains power cables for the travelling cutter.

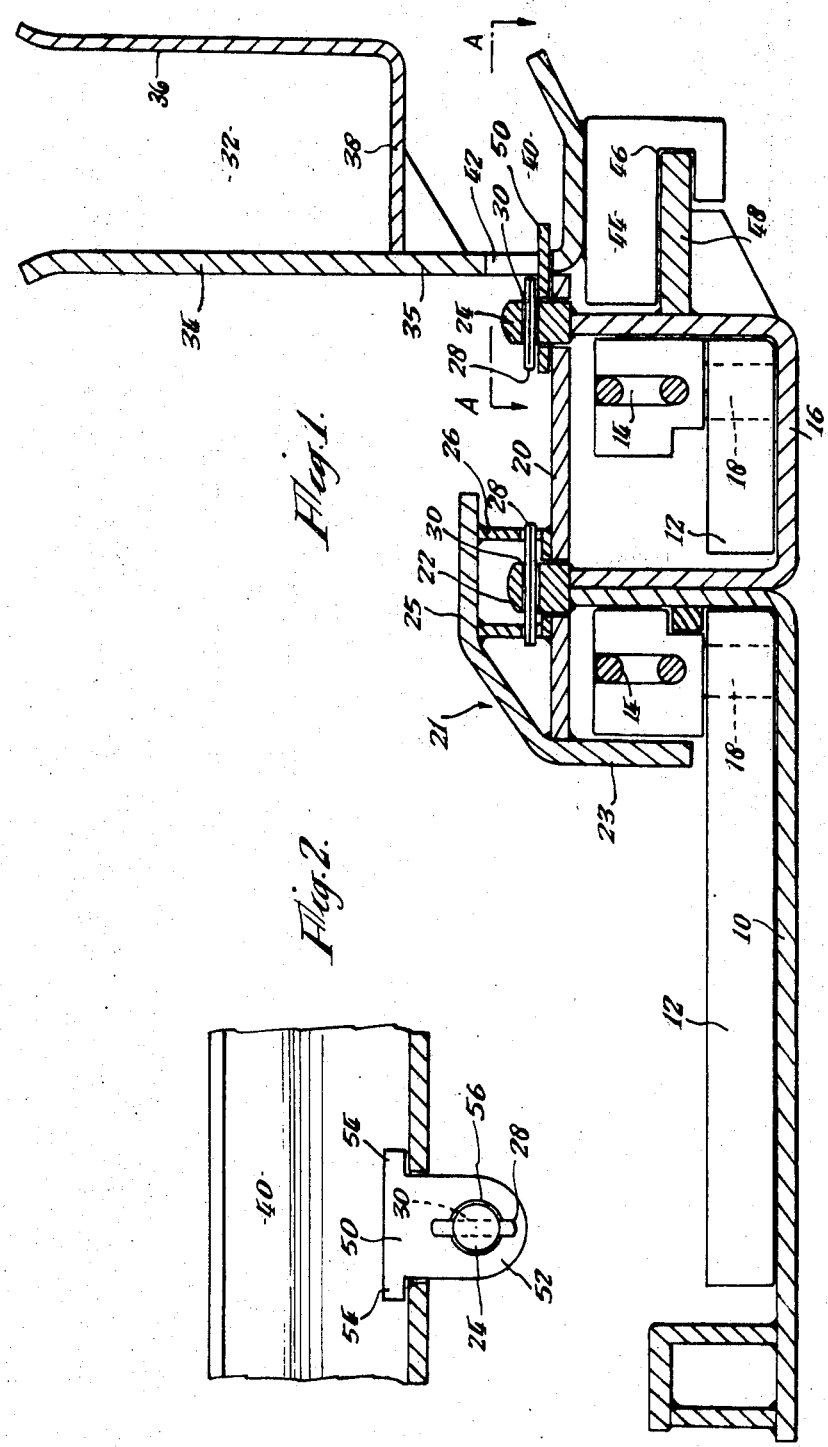

CABLE HANDLER TROUGHS

This invention relates to cable handler troughs which are provided on chain conveyors, particularly those used at mining faces.

At a mining face a conveyor for the materials being mined is arranged generally parallel to the face and the cutting machine is mounted on a platform supported by and movable longitudinally relative to the conveyor. In use, the cutting machine moves along the conveyor cutting at the mine face as it goes. The materials cut from the face are projected on to the conveyor adjacent the platform and are thus removed. As the mining face is cut away the conveyor is advanced by means of hydraulic rams so that the work can proceed automatically. The cutting machine is usually electrically powered but could be hydraulically or pneumatically powered. In any case, it must have power supply cables and these cables must be located where they will not become entangled with machinery, and further they must be arranged so that the ends which are attached to the cutting machine can follow the machine as it traverses the mining face. To accomplish this, it is customary to locate these cables in a trough known as a "cable handler trough" which is mounted along the rear side portion of the conveyor. The cable handler trough is normally made up from a series of smaller component troughs longitudinally aligned and bolted to the conveyor. The term "cable handler trough" will be used herein to denote the complete trough or component trough, and the term "component trough" to denote only the smaller component trough. The cable handler trough is open at the top so that the cable can extend from the trough to the cutting machine at any point along the trough. There must of course be sufficient cable provided in the trough for it to be able to follow the cutting machine during its traverses. Particular difficulty has been found in mounting the or each trough to the conveyor in such a way that it can be easily dismounted from the conveyor, and also so that the covered portions of the conveyor are readily accessible for repair or inspection without dismounting any troughs. It is an object of the present invention to provide an improved means for mounting a cable handler trough to a conveyor.

According to one aspect of the present invention there is provided means for mounting a cable handler trough to a conveyor comprising a tongue and an upstanding pin, each provided on a fixed portion of the conveyor, a slot provided in a portion of the cable handler trough and arranged to receive said tongue, said tongue and slot being arranged so that the trough is restrained against vertical movement relative to the conveyor, an opening provided in a generally upright portion of the trough adjacent the conveyor, and a locking plate having an aperture adapted to receive said pin and shoulders adapted to engage said portion of the trough on its face remote from said pin and adjacent the sides of the said opening when the locking plate is in its locking position, the arrangement being such that the locking plate can be put into and removed from its locking position whilst the trough is correctly located relatively to the conveyor.

The locking plate may be T-shaped with the said aperture in the leg of the T, and adapted so that the leg of the T can pass through said opening in the trough from the side remote from the conveyor with small lateral clearance but substantial vertical clearance while the arms of the T engage the portion adjacent each side of the opening in which position the apertured leg of the T can be passed over the upstanding pin, whereby the trough is restrained against lateral movement relative to the conveyor.

Preferably a horizontal passage is provided through the upstanding pin adapted to receive a split dowel or the like means for retaining the said locking plate.

Preferably a plurality of said trough mounting means is provided for each cable handler trough.

In order that the invention may be more clearly understood a specific embodiment will now be described with reference to the accompanying drawing, wherein:

FIG. 1 shows a cross-sectional end view through a conveyor having a cable handler trough mounted thereon; and FIG. 2 shows a fragmentary plan view taken on the line A-A of FIG. 1.

Referring to the drawing the conveyor comprises a pan 10 along which move conveying flights 12 which are pivotally mounted at their inner ends to a drive chain 14. A channel 16 is provided alongside pan 10 to receive the flights 12 and chain 14 during the return run, in which position the flights 12 have assumed a trailing attitude relative to their pivot pins 18. A more complete description of this kind of conveyor is described in the specification of U.S. Pat. No. 3,472,556.

A protective cover plate 20 is mounted over the drive chain 14 both on the driving run and the return run. A second plate 21 welded to the plate 20 provides a protective side cover 23 for the chain during the driving run, and is extended upwardly at 25 over the plate 20. A U-shaped channel girder 26 extends between the plate 20 and the portion 25 of plate 21 and is welded to both. The plate 20 is mounted to the conveyor by providing it with a number of apertures arranged so that the plate can be slidably engaged over upstanding pins 22, 24 provided on the conveyor each side of the channel 16. The apertures for the pins 22 extend through both the channel 20 and the bottom web of the channel girder 26. The pins 22 are arranged along the inner edge of the channel 16 and the pins 24 are arranged along its outer edge. The plate is retained on the pins by passing a sprung dowel 28 through a horizontal passage 30 provided in the pin. Apertures in the sidewalls of the channel girder 26 provide access for the dowels 28 to the pins 22. By this means, the cover plates 20 can be readily removed for inspection or repair since it is much quicker to remove the dowel 28 from the passage 30 than it would be to unscrew a nut from a bolt. In addition, there is less tendency for the pin and dowel to become locked as a result of corrosion.

To this conveyor may be mounted a cable handler trough made up from a number of component troughs 32. Each trough 32 comprises an inner sidewall 34 (nearest the conveyor), an outer sidewall 36 (remote from the conveyor) and a horizontal floor 38. The inner wall 34 extends to form an upright portion 35 below the level of the floor 38 and below this member is turned under to form a lower shallow trough 40, in which can be located for instance the cables which carry power to the conveyor drive mechanism. The portion 35 is provided with one or more rectangular openings 42. In addition, a block 44 is welded to the underside of the horizontal portion 40 of the trough. The block 44 is provided with a generally horizontal slot 46 opening towards the conveyor. A generally horizontal tongue 48 is welded to the outside wall of the return channel 16 of the conveyor, and the cable handler component trough is mounted to a conveyor by slidably engaging the slot 46 in the block 44 over the tongue 48. Each aperture 42 in the component trough is arranged so as to be opposite a pin 24 on the conveyor. A T-shaped locking plate 50 is provided having a broad leg 52 and stub arms 54. The width of the leg 52 is such that it can slide through the opening 42 with small clearance (see FIG. 2). The thickness of the plate is, however, much less than the depth of the opening 42 (see FIG. 1). The arms 54 of the plate engage the portion 35 adjacent each side of the opening 42 thus preventing the plate from passing through the opening. The leg 52 is provided with an aperture 56 in which the adjacent pin 24 can be slidably located.

To complete the mounting of the component trough to the conveyor, the leg 52 of the locking plate 50 passes through the aperture 42 so that the arms 54 of the locking plate engage the face of the portion 35 of the trough adjacent each side of the opening 42 on the side remote from the conveyor. Because of the substantial vertical clearance provided for the plate 50 within the aperture 42, the leg 52 can be raised and the pin 24 can be located within the aperture 56. The plate 50 is locked in position by passing a split dowel 28 through the passage 30 in the pin 24.

It will be seen that by mounting the cable handler trough to the conveyor in this way the protective cover 20 can be easily detached from the conveyor for inspection or repair of the conveyor. Because of the large freedom of vertical movement permitted in the locking plate 50, the plate 20 can be removed without in any way disturbing the adjacent cable handler trough. Since the trough will normally be made up of a number of component troughs longitudinally aligned, freeing the locking plates of one of these component troughs will not allow it to be accidentally detached from the conveyor since it will be held in position by the cable running through it.

I claim:

1. A conveyor and a cable handler trough and means for mounting the cable handler trough to the conveyor, said means comprising a tongue and an upstanding pin, each provided on a fixed portion of the conveyor, a slot provided in a portion of the cable handler trough and arranged to receive said tongue, said tongue and slot being arranged so that the trough is restrained against vertical movement relative to the conveyor, an opening provided in a generally upright portion of the trough adjacent the conveyor, and a locking plate having an aperture adapted to receive said pin and shoulders adapted to engage said portion of the trough on its face remote from said pin and adjacent the sides of the said opening when the locking plate is in its locking position, the arrangement being such that the locking plate can be put into and removed from its locking position whilst the trough is correctly located relatively to the conveyor.

2. A conveyor and a cable handler trough, and means according to claim 1 for mounting the cable handler trough to the conveyor wherein the locking plate is T-shaped with the said aperture in the leg of the T, and adapted so that the leg of the T can pass through said opening in the trough from the side remote from the conveyor with small lateral clearance but substantial vertical clearance while the arms of the T engage the portion of the trough adjacent each side of the opening in which position the apertured leg of the T can be passed over the upstanding pin, whereby the trough is restrained against lateral movement relative to the conveyor.

3. A conveyor and a cable handler trough, and means according to claim 1 for mounting the cable handler trough to the conveyor wherein said tongue and slot are essentially horizontal.

4. A conveyor and a cable handler trough, and means according to claim 1 for mounting the cable handler trough to the conveyor wherein the locking plate is retained on the upstanding pin by a split dowel passed through a horizontal passage in the pin.